3,141,012
RECOVERING SOLID POLYHYDRIC ALCOHOLS FROM TRANSESTERIFICATION REACTION MASSES
Charles J. O'Boyle, Gramercy, La., assignor to North American Sugar Industries Incorporated, a corporation of New Jersey
No Drawing. Filed June 1, 1960, Ser. No. 33,116
19 Claims. (Cl. 260—210)

This invention is concerned with a process for the refining of polyhydric alcohol esters, and in particular, it is concerned with a method for separating unreacted solid polyhydric alcohols from reaction mixtures in which esters of the polyhydric alcohols have been prepared.

In one aspect the invention relates to improvements in procedures for the preparation of esters of solid polyhydric alcohols in which the ester product contains substantial amounts of monoesterified polyhydric alcohol. Esters of this type are useful as chemical intermediates and surface active agents. As chemical intermediates, they are especially useful in the preparation of synthetic resins, waxes, drying oils, and lubricants. As surface active agents, they are especially useful as emulsifiers, as dispersing and wetting agents, as textile processing assistants, and as ingredients in detergents, cosmetics, pharmaceuticals and foods.

Ester compositions of the type sought to be made and purified by this invention have found only limited commercial use, in spite of their value in the applications mentioned above, because of difficulties which have been experienced in isolating and refining them after they have been synthesized by transesterification reactions between the polyhydric alcohol and an ester reagent containing the acid moiety to be incorporated in the polyhydric alcohol ester.

The type of reaction here concerned can be represented by the equation:

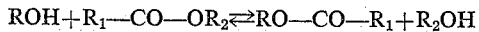

$$ROH + R_1-CO-OR_2 \rightleftharpoons RO-CO-R_1 + R_2OH$$

where R represents the residue of the polyhydric alcohol, $R_1$ represents the residue of the carboxy acid moiety of the ester reagent, and $R_2$ represents the residue of the alcohol moiety of the ester reagent.

To minimize side reactions in the synthesis of the esters by transesterification, moderate temperatures are required, thereby also requiring the use of costly primary solvents to dissolve polyhydric alcohol and the ester reagents. Also, in order to obtain products which contain substantial amounts of monoesterified polyhydric alcohol, it is necessary to use a large amount of polyhydric alcohol in the reaction mixture, and to have an excess of unreacted polyhydric alcohol in the reaction mass at the end of the synthesis. This unreacted polyhydric alcohol must be separated from the reaction product, and recovered in easily reuseable form in order to obtain economical manufacturing costs, and further, must be separated from the ester product as completely as possible to prevent its presence from stiffening the consistency of the crude reaction products. In this latter instance, its presence renders complete stripping and recovery of the costly reaction solvent difficult without causing overheating of the reaction mass, which overheating results in contamination of the ester product with decomposition products. The reaction solvent also must be recovered as completely as possible in order to obtain economical manufacturing costs. In addition, many of the applications of the ester products will tolerate the presence of only small percentages of unreacted polyhydric alcohol or reaction solvents.

In the past, the separation of unreacted polyhydric alcohol and reaction solvents from the ester preparations has presented problems, because the procedures available have been complicated and costly, have not given recovery of polyhydric alcohol and the reaction solvent in forms which permitted easy reuse thereof, and have not given a product sufficiently free of polyhydric alcohol and solvent to permit economical use thereof in non-critical applications such as detergency. Also, the products conventionally obtained have been difficult to refine to products suitable for use in critical applications such as cosmetics, pharmaceuticals and foods. The present invention provides an economically feasible solution to these problems.

In general, polyhydric alcohol esters are prepared according to the present invention by reacting the polyhydric alcohol, in a transesterification reaction, with an ester of an alcohol and a carboxylic acid under conditions to form polyhydric alcohol esters and to release the alcohol. The reaction is carried out in the presence of a primary solvent and an alkaline catalyst for the reaction, and utilizes a large excess of polyhydric alcohol to promote formation of a large proportion of polyhydric monoester.

Subsequent to the reaction, the reaction mass is mixed with a secondary solvent for the above primary reaction solvent. With proper control of temperature, the unreacted polyhydric alcohol is precipitated from solution and easily removed by means such as filtration, centrifugation, decantation, or sedimentation. The solution, after removal of the unreacted polyhydric alcohol, is then distilled to remove the primary and secondary solvents leaving as residue the desired polyhydric alcohol ester product which contains only small amounts of polyhydric alcohol and solvents.

By using suitable secondary solvents, both the primary and secondary solvents are recovered in easily reuseable form, and without resorting to the use of costly drying operations. Also, by using a suitable secondary solvent, the unreacted polyhydric alcohol is substantially completely removed, obviating the possibility of contamination of the reaction product during subsequent recovery of the solvents by distillation, and further is recovered in a form permitting its reuse with little or no additional processing. Also, the polyhydric alcohol ester is obtained in a form suitable for many applications without further refining or, if desired, in a form which may be easily refined to produce a product having as high a purity as might be required for use in such applications as cosmetics, pharmaceuticals and foods.

Generally, the polyhydric alcohols that can be used effectively in the process are those aliphatic substances that have at least 4 free (unesterified) hydroxyl groups, 4 to 18 carbon atoms, and a melting point at least as high as 85° C. They should also be free of groups that interfere with esterification reactions. The present method lends itself especially to esters of non-reducing oligosaccharides, such as sucrose and raffinose. Specific materials include pentaerythritol, dipentaerythritol, tripentaerythritol, sorbitol, mannitol, the lower alkyl glucosides, N-acetyl glucosamine,

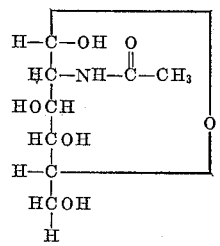

N-urea glucoside, or

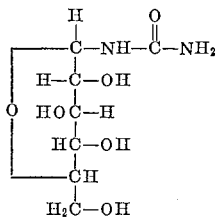

N,N-urea diglucoside

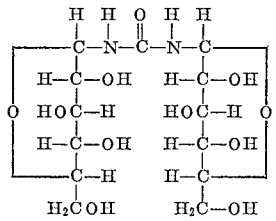

Mixtures of the polyhydric alcohols can also be used. Such mixtures include mixtures of sucrose and raffinose obtained in refining of beet sugar, and mixtures of sorbitol and mannitol which are obtained by reduction of corn sugar and invert sugar, and mixtures of the various pentaerythritols which are obtained by the condensation of acetaldehyde and formaldehyde with alkaline catalysts.

A number of primary reaction solvents may be used for the transesterification. The first group consists of amides of lower fatty acids having the formula, (1) 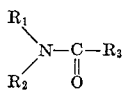

wherein:

$R_1$ is of the class consisting of alkyl and alkoxy-alkyl groups having 1 to 5 carbon atoms;

$R_2$ is of the class consisting of hydrogen, alkyl, and alkoxy-alkyl groups having 1 to 5 carbon atoms; and $R_3$ is of the class consisting of hydrogen and an alkyl group having 1 to 3 carbon atoms, the total number of carbon atoms being not greater than 8, and preferably not greater than 6.

This group includes dimethyl formamide; dimethyl acetamide; N-n amyl, N-methyl formamide; N,N-dimethoxyethyl formamide; N-methyl, N-methoxyethyl formamide; N-methyl, N-ethoxyethyl formamide; and N-methyl formamide.

The second group is also composed of amides of lower fatty acids, having the formula, (2) 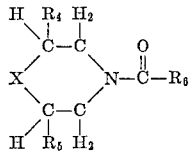

wherein:

$R_4$ and $R_5$ are of the class consisting of hydrogen and an alkyl group having 1 to 2 carbon atoms;

$R_6$ is of the class consisting of hydrogen and an alkyl group having 1 to 3 carbon atoms; and X is of the class consisting of —O—,

and —CH$_2$—, the total number of carbon atoms being not greater than 8, and preferably not greater than 6.

This group of primary solvents includes N-formyl morpholine:

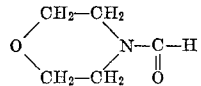

N-acetyl morpholine; N-propionyl morpholine; dimethyl, N-formyl morpholine:

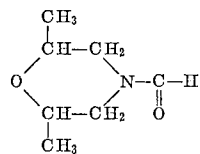

N formyl piperidine:

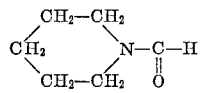

N acetyl piperidine:

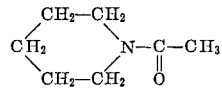

The third group of primary solvents are tertiary amines having the formula, (3) 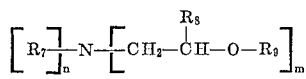

wherein:

$R_7$ is alkyl having 1 to 2 carbon atoms;

$R_8$ is of the class consisting of hydrogen and methyl;

$R_9$ is alkyl 1 to 2 carbon atoms, $n$ is an integer of 0 to 2, $m$ is an integer of 1 to 3, and $n+m=3$, and the total number of carbon atoms is not greater than 9.

Examples include dimethyl, methoxyethyl amine

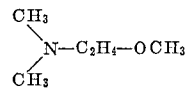

methyl, dimethoxyethyl amine; dimethyl, ethoxyethyl amine; methyl, ethyl, methoxyethyl amine; and dimethyl, 2-methoxypropyl amine.

The fourth group of primary solvents are the N-alkyl pyrrolidones and caprolactams, having the formula,

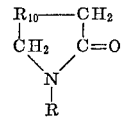

wherein:

R is hydrogen or alkyl having 1 to 4 carbon atoms, and $R_{10}$ is of the class consisting of $CH_2$ and $C_2H_4$.

Examples include N-methyl, 2-pyrrolidone,

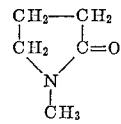

N-butyl pyrrolidone; and n-methyl caprolactam,

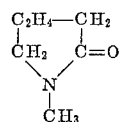

Mixtures of the primary reaction solvents described above may also be used.

The ester reactants which may be used in the transesterification reaction are derived from the aliphatic alcohols, glycols and glycerine on the one hand, and mono, di and polycarboxylic acids having from 2 to about 32 carbon atoms on the other hand, the latter being free of groups which would interfere with the transesterification reaction, and containing no more than 2 oxygen atoms in addition to those in the carboxyl groups. Some of these ester reactants are: tallow and other fats, cottonseed, coconut, oiticica, castor and other vegetable oils, fish and whale oils, methyl acetate, methyl esters of tall oil fatty acids, methyl salicylate, methyl esters of rosin acids, methyl esters of naphthenic acids derived from petroleum, the ester component of various vegetable waxes such as carauba and sugar cane wax, ethyl oleate, ethyl stearate, ethyl benzoate, dimethyl fumarate, diethyl maleate, triethyl citrate, triethyl acetyl citrate, triethyl stearoyl citrate, dimethyl itaconate, dibutyl adipate, dimethyl azeleate, the isomeric dimethyl phthalates, methyl esters of di and tri basic acids which are obtained by polymerization of mixtures of mono, di and tri unsaturated fatty acids, methyl esters of the tri and polybasic acids which can be prepared by condensation of methyl esters of maleic and fumaric acids with methyl esters of oleic, linoleic and other unsaturated fatty acids, methyl linoleate, ethyl esters of tallow fatty acids and the like, and mixtures of these esters.

As indicated above, the principal feature of the invention is in the use of secondary hydrocarbon containing solvents capable of providing the desired results, or essentially, capable of obtaining substantially complete precipitation of the excess solid polyhydric alcohol from the transesterification reaction mass. Oxygenated hydrocarbon solvents such as alcohols, ethers, esters, and ketones will precipitate the solid polyhydric alcohols from the reaction masses, but separation of unreacted solid polyhydric alcohol is less complete even when large amounts of these oxygenated solvents are used, and these materials are more expensive than the secondary solvents of this invention. It has been found that including a substantial amount of hydrocarbon solvent, i.e., at least about 50%, in the secondary solvent along with the oxygenated hydrocarbon permits substantially complete separation of unreacted solid polyhydric alcohol, and in some cases, it has been found that hydrocarbons alone can be used as the secondary solvent. These results are surprising since it would be expected that highly polar monoesters in the product would precipitate with the unreacted solid polyhydric alcohols in the presence of the large amounts of hydrocarbons used.

Suitable secondary solvents, composed of both oxygenated hydrocarbon solvents and hydrocarbons, include those compositions which contain up to 50% of alcohol, ester, ether, or ketone solvent, the latter having less than 11 carbon atoms and no more than 4 oxygen atoms and no more than 2 hydroxyl groups in each molecule, and hydrocarbons having boiling ranges which fall below 360° C. at atmospheric pressure. The amount of oxygenated solvent should be sufficient to reduce the Aniline Point of the mixed solvent to not greater than 130. Some of the oxygenated hydrocarbons which can be used are methanol, ethanol, isopropanol, secondary butanol, normal butanol, the various amyl alcohols, methyl isobutyl carbinol, ethoxyethanol, diacetone alcohol, propylene glycol, ethyl acetate, acetone, methyl ethyl ketone, and methyl isobutyl ketone and mixtures thereof. Hydrocarbon solvents which can be used in these secondary solvent compositions include pentane, hexane, heptane, benzene, toluene, the xylenes, and the various mixed hydrocarbon solvents of petroleum and coal tar origin such as mineral spirits and the naphthas used in the coatings industry, and may include mixtures of very high and very low aromatic content. Terpene hydrocarbons may also be used.

Secondary solvents containing only hydrocarbons can be used in precipitating unreacted solid polyhydric alcohols from reaction mixtures. Solvents suitable for this purpose should have Aniline Points not above 130° F., and boiling ranges below 350° C. Specific examples of suitable solvents are coal tar and petroleum solvents such as toluene (Aniline Point=—57° F., boiling point =110.6° C.), xylol (a mixture of xylenes, Aniline Point=—53° F., boiling range 138°–142° C.), Varnish Makers and Painters Naphtha (Aniline Point=125° F., boiling range=117°–145° C.), and Solvesso 150 (a Standard Oil Company of New Jersey trademark for a mixture of hydrocarbon petroleum distillates having a boiling range between 186–211° C., and an Aniline Point of —22° F.), and Hi Flash CTN (a light-oil distillate having a boiling range of 145–185° C., and an Aniline Point of —12° F.).

The Aniline Point of a solvent is the minimum equilibrium solution temperature for equal volumes of aniline and sample (ASTM Test: D611–55T, page 285, ASTM Standards 1958, Part 7). Most commercial hydrocarbon solvents are assigned Aniline Point values as part of the specifications which describe them. The selection of suitable hydrocarbon secondary solvents can be based on these assigned values.

Under certain circumstances, it may be desirable to use special mixtures of hydrocarbon solvents such as the mixture of low boiling aromatic compound such as toluene and a higher boiling aliphatic solvent such as Shell Sol 71 (boiling range, 174.4–200° C., Aniline Point 186° F.). The Shell Sol 71 alone will not precipitate solid polyhydric alcohols but addition of toluene to lower the Aniline Point gives a solvent which is an excellent precipitant and which has the advantage that the higher boiling aliphatic permits stripping the bulk of the primary solvent from the reaction mass by distillation. On cooling, the "Shell Sol 71" in the distillate separates from the recovered reaction solvent, thus reducing recovery costs.

I have discovered that, by selecting as the oxygenated hydrocarbon components of the secondary solvent certain glycols and/or esters which boil above the hydrocarbon components of the secondary solvent and also above the primary solvent itself, it is possible to distill off or evaporate essentially all of the hydrocarbon solvent and primary solvent to get products which are suitable for cosmetic, food and/or pharmaceutical uses from the standpoints of satisfactory flavor, odor and freedom from toxicity and skin irritating properties. Some of the oxygenated solvents which have been found to be suitable for this special application are propylene glycol, propylene glycol mono esters of lower fatty acids of even number carbon chains, diethyl adipate, diethyl succinate, ethyl caprylate and methyl caprate.

When mixtures of hydrocarbon and polar solvents or mixtures of two or more hydrocarbon solvents are used as the secondary solvent, these secondary solvent components can be mixed with each other before mixing with the reaction mass or they can be mixed with the reaction mass separately.

Glycerine, and other tri and polyhydroxy compounds, are not suitable for use as components of the secondary precipitating solvent systems, but the presence of compounds of these types in limited quantities will not interfere with precipitation and separation of unreacted solid polyhydric alcohols.

The amount of primary solvent in the reaction mass at the time of adding the secondary solvent should be sufficient to keep substantially all of the polyhydric alcohol ester in solution after the secondary solvent has been mixed with the reaction mass and at the temperature of separation of the unreacted solid polyhydric alcohol. It is also desirable to retain a sufficient amount of primary solvent to afford mechanical ease of handling the material. Pursuant to these objectives, it is preferred that the reaction mass to which the secondary solvent is added contain at least about 20% by weight of primary solvent, and preferably 30–80% by weight.

The procedure of this invention is applicable in preparing ester compositions containing substantial proportions of monoesterified polyhydric alcohol. To accomplish this, the effective reaction ratio of solid polyhydric alcohol to ester reagent should be at least 1.2 moles of the solid polyhydric alcohol per equivalent of ester reagent that reacts by interesterification.

The amount of secondary solvent added should be sufficient to cause substantially complete precipitation of the unreacted polyhydric alcohol. The weight required will run from 0.6 to 7.0 times the weight of the primary solvent and the preferred amount is 0.8 to 4 times the weight of primary solvent. Also, the temperature at which the secondary solvent is mixed with the reaction mass should be high enough to cause the primary and the secondary solvents to dissolve in each other sufficiently to cause the unreacted polyhydric alcohol to precipitate. In general, the best results, depending upon the particular secondary and primary solvents used, will be obtained by employing a mixing or precipitating temperature within the range of 50° C. to about 140° C. and a separation temperature within the range of 20° C. to 100° C.

If it is desired to obtain high yields of monoesterified polyhydroxy substance, the catalyst should be inactivated either before or during the precipitation of the unreacted solid polyhydric alcohol. Inactivation of the catalyst can be effected by running the reaction so long that side reactions, such as soap formation, consume the catalyst, or by neutralizing the catalyst by means of acid substances, such as acetic acid and other carboxy acids, sulfonic acids, mineral acids and acid salts of di and tribasic acids and the like.

In lieu of inactivating the catalyst, the side reaction can be minimized by rapidly reducing the temperature before or during the precipitation of the solid polyhydric alcohol, but in this case subsequent processing must be conducted at temperatures below those which can be used when the catalyst has been inactivated.

After precipitation, the unreacted solid polyhydric alcohol is easily removed from the reaction mass by conventional physical means, such as sedimentation, filtration, or centrifugation, and the solid polyhydric alcohol is obtained in a form which permits its reuse in the process with a minimum of processing since, in most cases, the solvent in the wet solid polyhydric alcohol will be removed in the initial steps of the transesterification operation. In general, the best results in the separation of unreacted solid polyhydric alcohol are obtained at temperatures lower than the mixing temperatures mentioned above. In most cases, the best results will be obtained in the temperature range of 20° C. and 100° C.

EXAMPLE I

Methyl alpha-D-glucoside (21.6 moles, 4194 grams), technical methyl palmitate (5.0 moles, 1350 grams), and a primary solvent, dimethyl formamide (5940 grams DMF) were charged to a 22 liter round bottom flask fitted with a close fitting crescent-shaped stainless steel agitator, a thermometer for reading batch temperature, and an efficient distilling column. The batch was agitated, heated to 110° C. and distillate (DMF and water) removed dropwise under vacuum while maintaining a batch temperature of 110° C. and a high rate of reflux. Distillation was continued for 30 minutes during which time 823 grams of distillate were collected in a still head receiver, and in an acetone Dry Ice trap, which was in the line to the vacuum pump. The flask was then vented to atmospheric pressure.

Anhydrous potassium carbonate catalyst (18.6 grams) was charged to the batch and the distillation under reduced pressure at a batch temperature of 110° C. was resumed. The distillate take off stopcock on the still head was closed to maintain a high rate of reflux. An ice water cooled condenser operating as a partial condenser permitted most of the methanol formed by the transesterification reaction to pass into the vacuum line wherein it was condensed in the acetone Dry Ice trap. This distillation was continued for 143 minutes with the batch temperature in the range 109–110° C. The still head take off stopcock was then opened and the distillation continued while removing distillate dropwise during 35 minutes. The heat was then turned off and the system vented to atmospheric pressure.

The reaction conditions described above gave substantially complete reaction of methyl palmitate with the polyhydric substance (methyl alpha-D-glucoside). The distillate collected during the reaction period weighed 903 grams including approximately 160 grams of methanol, so that at this point the batch contained approximately 4374 grams of dimethyl formamide.

The batch was then neutralized by adding glacial acetic acid (16.2 grams) followed by 8 minutes of agitation. A secondary solvent, toluene (7290 grams, preheated to 60° C.), 1.67 parts per part of DMF, was charged during 5 minutes while the batch temperature went from 108° C. to 97° C. Agitation was continued for 23 minutes while the temperature dropped to 93° C. During this time, a crust and lumps of precipitated methyl glucoside formed, which were broken up by the agitation.

The batch was centrifuged and washed using toluene (1188 grams) preheated to 60° C. as a wash, to obtain 3177 grams of nearly dry (94.5% solids) methyl glucoside. This recovery represents 71.6% of the methyl glucoside charged.

The combined filtrate and wash (13,519 grams) was charged back to the same apparatus in which the reaction was run, and these stripped under vacuum during 46 minutes with 110 r.p.m. agitation to a weight of 3957 grams while holding the batch temperature in the range 79–81° C. by reducing the pressure to keep the batch boiling. The apparatus was then vented to atmospheric pressure and the batch charged to a 5 liter round bottom cylindrical glass resin pot, which was fitted with a close fitting anchor-shaped stainless steel agitator, a thermofitting anchor-shaped stainless steel agitator, a thermometer for reading batch temperature and a large vapor take off line which was connected to a condenser and a vacuum pump.

In the resin pot, the batch was agitated and stripped under vacuum with the batch temperature held in the range 79–82° C. during 72 minutes while the pressure was reduced gradually to 0.35 mm. of mercury, so as to maintain distillation. The electric heating mantle was then removed from the pot, the apparatus vented to atmospheric pressure, and the agitator stopped. The residue in the pot weighed 2522 grams and this product was found to contain 89.4% esters, 0.36% methyl D-glucoside and the balance dimethyl formamide.

EXAMPLE II

This procedure was run using the same apparatus, method and reagents as Example I except that pentaerythritol (21.6 moles, 2941 grams) replaced methyl alpha-D-glucoside as the solid polyhydric alcohol. Also, the amount of dimethyl formamide primary solvent distilled during the drying and reaction steps was increased, so that the dimethyl formamide content of the batch at the time of neutralization and toluene addition was 4965 grams (1.47 parts toluene per part of DMF).

The recovered centrifuge cake or pentaerythritol was dry when removed from the centrifuge bowl and weighed 2269 grams, equivalent to 77.2% of the pentaerythritol charged.

The product weighed 1983 grams and analyzed 91.7% esters, 1.87% pentaerythritol and 3.68% dimethyl formamide.

EXAMPLE III

Sucrose, 10.8 moles (3697 grams of refined cane sugar), methyl esters of tall oil fatty acids (3.0 equivalents, 903 grams), and 5940 grams of dimethyl formamide were charged to a 22 liter round bottom flask fitted with an agitator, a thermometer for reading batch temperature and a efficient distilling column. The batch was agitated and heated to 110° C. and then distilled dropwise under vacuum at batch temperature of 110° C. for 30 minutes during which time 465 grams of distillate were collected. The flask was then vented to atmospheric pressure, and K₂CO₃ (18.6 grams) catalyst was charged. Distillation under reduced pressure at a batch temperature of 110° C. was resumed, using an ice water cooled condenser at the head of the column as a partial condenser to obtain a high rate of reflux. Methanol produced by the reaction (along with some dimethyl formamide) was condensed in a Dry Ice acetone trap in the vacuum line. This distillation was continued for 178 minutes, with a batch temperature in the range 109.5–111° C., during which time 249 grams of distillate were collected in the Dry Ice acetone trap. During the next 43 minutes, 408 grams of distillate were collected dropwise from the still head while the batch temperature was held at 110° C. and a high reflux was maintained in the column. The power was cut off the electric heater of the flask, and the apparatus vented to atmospheric pressure. At this point, the batch contained approximately 4914 grams of DMF.

Acetic acid (16.2 grams), was then charged and the pot temperature was held at 109° C. The batch was agitated for 5 minutes and then petroleum derived toluene (5940 grams, 1.25 parts per part of DMF preheated to 60° C.) was charged during 2 minutes while the batch temperature dropped from 104° C. to 91° C. Agitation of the batch was continued for 10 minutes while the temperature dropped to 90° C. The batch was then centrifuged to filter off the precipitated sugar. The cake on the centrifuge was washed with toluene (1188 grams preheated to 60° C.) the wash being combined with the main filtrate. The wet centrifuge cake weighed 3109 grams with a solids content of 89%, which is equivalent to 2767 grams of dry sucrose. This recovery represents 8.08 moles of sucrose, which is equivalent of 74.8% of the sucrose charged.

The combined filtrate and wash (12,650 grams) were recharged to the apparatus in which the reaction was run and stripped under vacuum with 110 r.p.m. agitation to a weight of 3963 grams while holding the batch temperature in the range 79–81.5° C. by adjustment of the pressure. At the end of this preliminary stripping operation, the apparatus was vented to atmospheric pressure.

2018 grams (50.9%) of the stripped batch was charged to a 5 liter round bottom, cylindrical, glass resin pot which was fitted with a close fitting anchor-shaped stainless steel agitator, a thermometer for reading batch temperature and a large vapor take off line which was connected to an efficient condensing system and vacuum pump. The charge to the apparatus was agitated at 55 r.p.m. and stripped by vacuum distillation with the batch temperature held in the range of 78–82° C. during 57 minutes while pressure was reduced to maintain distillation. At the end of this period, the viscosity of the batch had increased greatly, so power to the electric pot heater was cut off while the pressure was continually reduced during a period of 3 minutes, in which time the batch temperature rose to a maximum of 90° C. and the pressure dropped to a minimum of 2.2 mm. At this point, the electric heating mantle was removed from the pot, the agitation stopped and the pot vented to atmospheric pressure. The residue in the pot weighed 997 grams. As it cooled, it turned into a pitchlike, soft but brittle solid, in which form it was discharged from the pot.

The 997 gram yield of the product corresponds to a total yield of 1959 grams if the whole batch had been stripped in the same manner. It was analyzed and found to contain 6.9% sugar, 3.7% dimethyl formamide and 87.9% sucrose esters. These values correspond to 7.9 parts of sugar per 100 parts of sucrose ester product and 4.2 parts of dimethyl formamide per 100 parts of sucrose ester product.

EXAMPLES IV–XI

The table below summarizes Example III along with additional examples which were run using the same apparatus, reagent and solvent charges (including 1.25 parts of toluene per part of DMF) and procedure as Example III, except that the methyl esters of tall oil fatty acids were replaced with methyl esters and glyceride esters of various carboxy acids in varying amounts as specified in the table:

*Table 1*

| Example Number and Ester Charge | Sugar | | | Sucrose Ester Product | | | | |
|---|---|---|---|---|---|---|---|---|
| | Recovered | | Consumed, moles | Percent sugar | Percent ester | Percent DMF | Yield, g. | |
| | Grams | Moles | | | | | "As is" | 100% basis (of ester) |
| III. Methyl esters of tall oil fatty acids, 903 g. (3.0 moles) | 2,600 | 7.59 | 3.21 | 6.9 | 87.9 | 3.69 | 1,959 | 1,724 |
| IV. Methyl oleate, technical, 889 g. (3.0 moles) | 2,668 | 7.80 | 3.00 | 3.2 | 91.4 | 1.55 | 1,913 | 1,748 |
| V. Methyl tallowate, 860 g. (3.0 moles) | 2,937 | 7.64 | 3.16 | 6.8 | 86.7 | 4.94 | 1,904 | 1,651 |
| VI. Methyl esters of coconut oil fatty acids, 669 g. (3.0 moles) | 2,943 | 7.98 | 2.82 | 4.8 | 86.8 | 4.83 | 1,716 | 1,490 |
| VII. Methyl salicylate, 457 g. (3.0 moles) | 3,686 | 8.38 | 2.42 |  | 91.6 | 12.5 | 1,437 | 1,257 |
| VIII. Methyl palmitate, technical, 1080 g. (4.0 moles) | 2,414 | 7.05 | 3.75 | 5.7 | 86.4 | 4.1 | 2,379 | 2,054 |
| IX. Methyl palmitate, technical, 1620 g. (6.0 moles) | 1,958 | 5.72 | 5.08 | 6.7 | 86.0 | 5.2 | 3,380 | 2,908 |
| X. Tallow, fancy, centrifuged, 860 g. (1.00 moles) | 3,342 | 9.77 | 1.03 | 10.1 | 58.2 | 1.8 | 790 | 460 |
| XI. Tallow, fancy, centrifuged, 574 g. (0.668 moles) | 3,042 | 9.01 | 1.79 | 3.1 | 88.4 | 4.8 | 1,269 | 1,145 |

The transesterification reactions of Examples III to IX, inclusive, went substantially to completion. The yield of Example X is low because only about half of the tallow reacted. The unreacted tallow (447 g.) was recovered by heptane extraction of the product of the final stripping. The analysis of the product of Example X indicated that it still contained some heptane.

It is notable that the conversion of triglyceride in Example X at a sucrose to glyceride mole ratio of 10.8 to 1 is rather low. However, an improvement is achieved in this conversion in Example XI by increasing this mole ratio to 16.3 to 1. This discovery that a very high mole ratio of sucrose to glyceride ester is required for high yields of sucrose esters has been confirmed by work with highly unsaturated triglyceride esters, such as cottonseed and safflower oils.

EXAMPLE XII

Following substantially the same procedure as in Example III, a preparation of sucrose monopalmitate was made using 9 moles of sucrose, and 2.25 moles of methyl palmitate with sufficient dimethyl formamide (DMF)

so that when the reaction was complete and the mass neutralized with acetic acid, 5962 grams of dimethyl formamide remained. This amount of dimethyl formamide was more than enough to hold all unreacted sucrose in solution at the 110° C. temperature of reaction and neutralization, and the 4 to 1 mole ratio of sucrose to fatty methyl ester was high enough to assure a product which is essentially 100% monoester of sucrose. After neutralization, this preparation was split up into a number of 50 gram aliquots, each of which contained 12.5 grams of sucrose, 6.6 grams of sucrose ester and the balance dimethyl formamide, which were used in the precipitation experiments which are summarized in the following table:

moved. It has the following typical properties: specific gravity at 60° F. of .7728; Aniline Point, 149° F.; distillation range, 156.7° C. to 180° C. "Lactol Spirits" is a hydrocarbon solvent having the following typical properties: specific gravity at 60° F. of .7499; Aniline Point, 109° F.; distillation range, 203° F. to 228° F. "Odorless 450 Solvent" is a hydrocarbon solvent synthesized from petroleum gases by the process of alkylation and typical properties are: initial boiling point, 209° C.; 50% distilled at 221° C.; and end boiling point, 231° C.; Aniline Point, 196° F.

Examples XII and XXII show the effects of variation of the nature of the solvent, the solvent ratio and temper-

*Table 2*

| Example Number | Precipitating Solvent (PS) | Aniline Point, °F. | PS/DMF, wt. Ratio | Temperature, °C. | | Unreacted Sugar | | Product Yield | |
|---|---|---|---|---|---|---|---|---|---|
| | | | | Mix | Filter | Recovered, Grams | In Product, Solids, Percent | Solids, Grams | Ester, Grams |
| XII | Toluene | −57 | 3.0 | 90 | 30 | 12.4 | 1.07 | 6.5 | 6.5 |
| XIII | do | −57 | 2.0 | 60 | 30 | 12.3 | 2.8 | 6.8 | 6.6 |
| XIV | do | −57 | 1.5 | 90 | 30 | 12.1 | 6.2 | 7.0 | 6.5 |
| XV | do | −57 | 1.5 | 50 | 50 | 11.6 | 10.7 | 7.1 | 6.3 |
| XVI | do | −57 | 1.0 | 60 | 30 | 11.6 | 11.8 | 7.6 | 6.6 |
| XVII | ½ Acetone, ½ Toluene | <−57 | 1.5 | 60 | 30 | 11.8 | 9.6 | 7.1 | 6.4 |
| XVIII | ½ Toluene, ½ Amsco Odorless 450 | 95.7 | 2.0 | 90 | 90 | 11.8 | 10.4 | 7.0 | 6.3 |
| XIX | Heptane | 127.4 | 3.0 | 90 | 90 | 11.8 | 11.6 | 6.2 | 5.5 |
| XX | ½ Heptane, ½ Acetone | | 1.5 | 50 | 50 | 11.44 | 14.54 | 7.59 | 6.48 |
| XXI | Lactol Spirits | 109 | 3.0 | 100 | 30 | 12.4 | 0.94 | 6.4 | 6.3 |
| XXII | VM & P Naphtha | 125 | 3.0 | 120 | 120 | 12.0 | 11.8 | 6.4 | 5.6 |

Example XVII illustrates how toluene may be mixed with low molecular weight oxygenated solvents up to 50% by weight of the latter.

Example XVIII shows that toluene may be mixed with hydrocarbon solvents having higher Aniline Points so long as the mixture has an Aniline Point not greater than 130.

The mixing and filtration temperatures maintained in the various examples illustrate that the temperature is selected according to the type of precipitating solvent in the reaction mixture. It will be observed that the materials having higher Aniline Points (Examples XIX, XXI and XXII) require high temperatures for efficient precipitation of unreacted sugar.

For purpose of comparison, the following results obtained with other secondary solvents and/or other operating conditions are given:

ature on the efficiency of separation of sugar from ester in the refining process. Low values for percent "unreacted sugar in product solids" indicate efficient separation of sugar from ester product and high values for yields of ester show that the unreacted sugar is precipitated free of ester product. The examples also show that separation efficiency decreases as the Aniline Point of precipitating hydrocarbon increases. An especially sharp break in efficiency is evident in going from Lactol Spirits (Example XXI, Aniline Point, 109° F.), through heptane (Example XIX, Analine Point, 127.4° F.) to Shell-Sol 360 (Aniline Point, 150.8° F.).

EXAMPLES XXIII–XXIV

Two (2) sucrose ester preparations were made following the same procedure as Example III, but using 2.5

*Table 3*

| Precipitating Solvent (PS) | Aniline Point, °F. | PS/DMF, Wt. Ratio | Temperature, °C. | | Unreacted Sugar | | Product Yield | |
|---|---|---|---|---|---|---|---|---|
| | | | Mix | Filter | Recovered, Grams | In Product, Solids, Percent | Solids, grams | Ester, Grams |
| Shell Sol 360 | 150.8 | 1.5 | 90 | 90 | 3.9 | 60.3 | 14.4 | 5.3 |
| Do | 150.8 | 3.0 | 120 | 120 | 6.8 | 57.6 | 10.5 | 4.3 |
| Shell Sol 14 | 141.8 | 3.0 | 120 | 120 | 8.9 | 34.8 | 8.2 | 4.6 |
| Mineral Spirits (Shell) | 131.4 | 3.0 | 120 | 120 | 8.5 | 41.3 | 9.8 | 5.8 |
| n-Butanol | | 1.0 | 60 | 30 | 10.48 | 24.2 | 8.6 | 6.6 |
| Isopropanol | | 3.0 | 60 | 30 | 10.7 | 21.3 | 8.4 | 6.6 |
| Acetone | | 1.0 | 60 | 30 | 9.6 | 28.9 | 9.0 | 6.4 |
| Do | | 1.5 | 60 | 30 | 11.0 | 20.9 | 8.0 | 6.4 |
| Do | | 1.5 | 50 | 50 | 10.5 | 26.4 | 8.5 | 6.3 |
| ⅔ Acetone, ⅓ Heptane | <84.6 | 1.5 | 50 | 50 | 11.0 | 18.9 | 7.7 | 6.2 |
| Heptane | 127.4 | 1.5 | 50 | 50 | No Sugar Precipitated | | | |

"Shell-Sol 14" is a hydrogen solvent, typical properties of which are: specific gravity at 60° F. of .7985; Aniline Point, 136° F.; initial boiling point of 362° F., and an end point of 408° F. "Shell-Sol 360" is a hydrocarbon solvent from which the aromatic hydrocarbons have been remoles of technical methyl palmitate instead of 3.0 moles of tall oil fatty acids, and using 7290 grams of toluene for sugar precipitation (1.5 parts per part of DMF) and, in the case of one preparation, eliminating the acetic acid neutralization step. The table below shows the results of these experiments in terms of the quantity and nature of the products:

| Example and Procedure | Product Yield and Properties | | | | |
|---|---|---|---|---|---|
| | Yield, Grams | Percent esters | Percent sugar | Sap. No. | Wetting tests, Shapiro's tape method in distilled H$_2$O |
| XXIII. Neutralized | 1,514 | 86.2 | 4.8 | 99.3 | 138 sec. at 0.1% conc. at 25° C., 37 sec. at 0.1% conc. at 60° C. |
| XXIV. Not neutralized. | 1,182 | 88.3 | 6.4 | 121 | 1,125 sec. at 0.1% conc. at 25° C., 100 sec. at 0.1% conc. at 60° C. |

The lower yield, higher saponification number and poorer wetting efficiency of Example XXIV as compared to EXAMPLE XXIII, is evidence that failure to inactivate the transesterification catalyst causes some important change in the nature of the esterification product. The transesterification reaction cannot be reversed since one of the products, methanol, has been eliminated by distillation, so the change caused by the presence of the catalyst must be of some other nature. In any case, it is evident that for products of maximum quality as hydrophilic surfactants it is necessary that the transesterification catalyst be inactivated before carrying out the sugar separation. For products not requiring maximum hydrophilic properties, the inactivation step may be unnecessary, and in some cases, undesirable.

EXAMPLE XXV

Following the procedure of Example III, a preparation of sorbitol monopalmitate was made using 1640 grams (9 moles) of sorbitol and 608 grams (2.25 moles) of methyl palmitate, with 7425 grams of N-methyl-2-pyrrolidone as reaction solvent. During the course of the dehydration and reaction steps, solvent was distilled so that 5632 grams remained in the batch, an amount which was sufficient to hold all the unreacted sorbitol in solution when reaction was complete and the catalyst inactivated with acetic acid. The reaction mass was packed in tightly closed jars.

The distillates obtained during the drying and reaction steps were ananlyzed for water. The very small amounts of water thus recovered were found to be substantially equal to the water charged with the reagents. Evidently, no cyclization-dehydration of sorbitol residues occurred under the conditions of this experiment, so the ester product consists of true sorbitol esters.

A 50 gram aliquot of the reaction mass, equivalent to 1/157.7 of the batch, was charged to a 300 cc. beaker, agitated, heated to 90° C. At this point, 81 grams of toluene preheated to 90° C. were added (2.27 parts per part of N-methyl-2-pyrrolidone). Agitation was continued without heat until the temperature was 30° C. and the aliquot was then filtered with suction. The filter cake was dried at 80° C. in a vacuum oven to give 8.49 grams of crude recovered sorbitol, equivalent to 1338 grams of crude recovered sorbitol on the whole batch. The filtrate was evaporated to dryness in an 80° C. circulating air oven and then dried at 80° C. under vacuum to yield 5.59 grams of product which contained 96.7% esters, equivalent to a yield of 867 grams of ester yield for the whole batch.

The miniature refining procedure of Example XXV was repeated using another 50 gram aliquot of the same reaction mass but with 81 grams of acetone as precipitant (2.27 parts per part of N-methyl-2-pyrrolidone), instead of the toluene, and with the mixing taking place at 60° C. and the filtration at 30° C. Very little precipitation of sorbitol took place, only 1.46 grams of dried filter cake being obtained, which is equivalent to only 230 grams of recovered sorbitol. The dried filtrate contained only 45% ester, so that the "product" consisted largely of sorbitol.

EXAMPLE XXVI

Following the procedure of Example XII but with reaction time of transesterification shortened by approximately one hour, an ester was prepared using 1640 grams (9 moles) of mannitol and 738 grams (2.25 equivalents) of the methyl ester of polymerized C$_{18}$ fat acids, consisting largely of dimers and trimers of unsaturated fat acids made by thermal treatment, which are sold by Wilson and Company under the brand name Wilmar Dioleic 150, using 7425 grams of dimethyl formamide as reaction solvent. During the course of the drying step and the reaction, solvent was distilled so that at then end of the reaction period and at the time of inactivation of the catalyst with acetic acid the reaction contained 5850 grams of dimethyl formamide, an amount which was sufficient to hold substantially all the unreacted mannitol in solution at the temperature (109° C.) of neutralization. This reaction mass was drawn off and packed into a number of tightly capped jars.

The distillates obtained during the drying and reaction steps were analyzed for water. The very small amounts of water thus recovered were found to be substantially equal to the water charged with the reagents. Evidently, no cyclization-dehydration of mannitol residues occurred under the conditions of this experiment, so the ester product consists of true mannitol esters.

A 2022 gram aliquot of the reaction mass, representing 25% of the batch, was charged to a 5 liter round bottom flask and agitated while 2165 grams of petroleum xylene were added (1.5 parts by weight per part of DMF). The batch was then agitated and heated to 111° C. and then filtered by suction while maintaining the feed to the filter funnel at 110° C. The mannitol cake on the filter was dried at 80° C. under vacuum to give 283 grams of recovered mannitol which was analyzed 91.29% mannitol, equivalent to 1033 grams of 100% mannitol on the basis of the whole batch.

The filtrate was stripped by distillation at 74–86° C. batch temperature until the product became too thick to agitate at which point the batch temperature was 86° C. and the pressure 4 mm. Hg. At this point, the product weighed 294 grams and became a glassy solid at room temperature. This product was dried under vacuum at 80° C. to give 277 grams of product containing 79.0% ester, equivalent to 874 grams of ester yield for the whole batch.

EXAMPLE XXVII

Using the same procedure as Example XII, a preparation of raffinose monopalmitate was made using 1338 grams (2.25 moles) raffinose pentahydrate, 152 grams (0.563 mole) of technical methyl palmitate and 4.65 grams of anhydrous K$_2$CO$_3$, using 6422 grams of dimethyl acetamide as solvent. During the reaction, solvent was distilled so that at the end of the reaction 3963 grams dimethyl acetamide remained in the mass when the catalyst was neutralized by addition of 4.05 grams of glacial acetic acid. After neutralization, 1100 grams of Shell-Sol 71 were added and the batch agitated until the temperature reached 39° C. Under these conditions, there was no appreciable precipitation of sugar and two layers formed. The upper (hydrocarbon rich layer) was separated in order to remove unreacted methyl esters and the lower (product layer) packaged in tightly capped jars.

A 1632 gram aliquot of the product layer, representing 30% of the batch was charged into a 2 liter resin pot and stripped by distillation with agitation at 80° C. until the residue in the pot weighed 784 grams. At this point, the residue contained 372 grams of dimethyl acetamide. The raffinose was precipitated from the residue by addition of 803 grams of hydrocarbon solvent (½ toluene and ½ Shell-Sol 360, the mixture having an Aniline Point of 63° F.), the temperature reaching 111° C. near the end of the solvent charging and being 106° C. at the end of the charging. Agitation was continued until the temperature dropped to 62° C. at which point the upper (product layer) was poured off the taffy-like lower (raffinose) layer which weighed 356 grams and contained 71.3% solids and 70.4% raffinose, equivalent to 847 grams of raffinose. The product layer was stripped by distillation in the resin pot at about 80° C. batch temperature until the batch became too thick to agitate well. The residue then weighed 158 grams and was a glassy solid at room temperature which contained 87.8% solids and 84.7% ester, representing 418 grams of 100% raffinose monopalmitate on the basis of the whole batch.

EXAMPLE XXVIII

Sucrose (1383 grams), 272 grams of "Eldo methyl 72" (a fraction of methyl esters of fatty acids from coconut oil corresponding to those obtained from tallow fatty acids) and 3100 grams dimethyl formamide (freshly distilled, water content 0.11%) were charged into a 5 liter flask with a close fitting stainless steel agitator (110 revolutions per minute drive) and fittings for vacuum distillation. The mixture was agitated, heated and evacuated for 47 minutes during which time the temperature rose from 22° to 115° C. and the pressure fell from atmospheric pressure to 21.1 inches of mercury vacuum. The mixture was then distilled at 115° C. for 51 minutes at vacuum of from 21.1 to 21.8 inches of mercury. 695.7 grams of dimethyl formamide were removed from the reaction mixture. The remaining material was vented and 10.0 grams of anhydrous potassium carbonate catalyst were added. Distillation was started again and continued for 22 minutes at a temperature of between 113° C. and 115° C. under a vacuum of from 21.8 inches to 21 inches. The mixture was distilled again for 45 minutes at 115–116° C. under a vacuum of from 21 to 22.1 inches of mercury. From this distillation, there was recovered a total of 771.7 grams of dimethyl formamide and methyl alcohol. The remaining material was again vented, treated with 10.0 grams of anhydrous potassium carbonate catalyst, and redistilled for a total of 32 minutes at a temperature of 116° C. and a vacuum of about 22 inches of mercury. A total of 430.7 grams of dimethyl formamide and methyl alcohol was recovered. The remaining material was agitated for 3 minutes at a temperature of 116° to 112° C. and a vacuum of 22 inches of mercury. It was then vented and agitated for an additional 5 minutes at a temperature of 112° to 110° C. A mixture of 6 grams of glacial acetic acid catalyst neutralizing agent and 1800 grams Solvesso 150 (Solvesso 150 is the Standard Oil Company of New Jersey trademark for a mixture of hydrocarbons having a boiling range of 186–211° C., a Kauri-Butanol number of 89.1 and an Aniline Point of minus 22° F.) was then charged into the mixture over a period of 8 minutes at a temperature of from 92° C. to 110° C. The resulting mixture was agitated for 5 minutes at a temperature of 92–90° C. and filtered with suction. The recovered unreacted sugar cake weighed 1344.6 grams and contained 80.0% solids, having a saponification number of 1.8. The sugar cake was washed with 600 grams of Solvesso 150 and the filtrate and wash (combined weight of 3795.8 grams) (29.9 grams was the weight of the trap condensate) was recharged to the pot and agitated with heating for 35 minutes during which time the temperature rose from 24° C. to 90° C. The mixture was then distilled over a period of 212 minutes at a temperature of from 90° to 92° C. and under a vacuum of 26.9 to 29.5 inches of mercury. During this distillation, 1151.3 grams of dimethyl formamide and 1644.2 grams Solvesso 150 were removed. The residue was steam distilled with 6500 cc. of water for 8 minutes at a temperature of from 92° to 70° C., at a vacuum of from 29.5 to 21.2 inches of mercury and then for 537 minutes at a temperature of from 69° to 70° C. under a vacuum of from 21.2 to 21.7 inches of mercury. A total of 377.9 grams Solvesso 150 and 6012.0 grams of water were recovered from the distillation. The residue was a gel weighing 871.2 grams and comprising 71.0% solids and 22.2% water.

Ten (10) grams of this were dried for 18.5 hours at a temperature of 70° C. and under a vacuum of 30 inches of mercury. The dried product weighed 7.1 grams. It had a surface tension of 41.6 dynes per centimeter at 0.005% concentration and a surface tension of 53.4 dynes per centimeter at 0.001 concentration. It assayed 0.09% nitrogen as dimethyl formamide.

In the procedure described in the examples the secondary solvent has been added to the reaction mass. However, the latter may be added to the former, if desired, or the two may be mixed simultaneously. Other modifications and equivalents are within the scope of the claims.

In the following claims, the term "effective reaction ratio" means the ratio of the number of moles of solid polyhydric alcohol initially changed to the number of equivalents of ester reagent which are converted to esters of solid polyhydric alcohol during the reaction period. For example, if 2.0 moles of sucrose and 1.0 mole of methyl palmitate are initially charged and the reaction carried out until 0.5 moles of methyl palmitate have been converted to sucrose palmitate, the effective reaction ratio is 4.0.

I claim:

1. A process of refining esters of solid polyhydric aliphatic non-reducing alcohols and carboxy acids, said alcohols containing 4 to 18 carbon atoms, at least four hydroxyl groups, being free of groups which interfere with transesterification reactions and having melting points at least as high as 85° C., and said acids having from 2 to about 32 carbon atoms, being free of groups which would interfere with the transesterification reaction, and containing no more than two oxygen atoms in addition to those in the carboxyl group, which esters have been synthesized by transesterification reaction in the presence of alkaline catalyst between said solid polyhydric alcohol and an ester of said carboxy acid and an alcohol which does not interfere with the transesterification reaction in effective reaction ratios of at least 1.2 moles of solid polyhydric alcohol charged per equivalent of ester reagent that reacts by transesterification, said interesterification taking place in a primary reaction solvent from the group consising of:

(1) 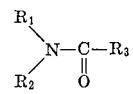

where:
R₁ is of the class consisting of alkyl and alkoxy-alkyl groups having 1 to 5 carbon atoms;
R₂ is of the class consisting of hydrogen, alkyl, and alkoxy-alkyl groups having 1 to 5 carbon atoms; and
R₃ is of the class consisting of hydrogen and an alkyl group having 1 to 3 carbon atoms, the total number of carbon atoms being not greater than 8;

(2) 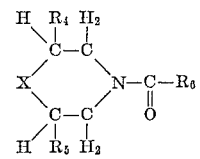

wherein:
R₄ and R₅ are of the class consisting of hydrogen and an alkyl group having 1 to 2 carbon atoms;
R₆ is of the class consisting of hydrogen and an alkyl group having 1 to 3 carbon atoms; and
X is of the class consisting of —O— and —CH₂— and

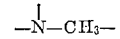

the total number of carbon atoms being not greater than 8;

(3) 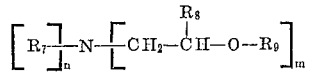

wherein:
 $R_7$ is alkyl having 1 to 2 carbon atoms;
 $R_8$ is of the class consisting of hydrogen and methyl;
 $R_9$ is alkyl having 1 to 2 carbon atoms;
 $n$ is an integer of 0 to 2;
 $m$ is an integer of 1 to 3; and
 $n+m=3$; and the total number of carbon atoms is not greater than 9;
and (4) 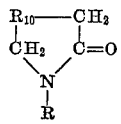

wherein:
 R is of the class consisting of hydrogen and alkyl having 1 to 4 carbon atoms; and
 $R_{10}$ is of the class consisting of $CH_2$ and $C_2H_4$;
the process comprising mixing with the reaction mass after transesterification and while it contains at least 20% by weight of the primary solvent, an amount of a secondary solvent sufficient to cause precipitation of the unreacted polyhydric alcohol, separating the precipitated polyhydric alcohol from the mother liquor, said secondary solvent being a hydrocarbon solvent with 0 to 50% of oxygenated hydrocarbon solvent in which each molecule contains no more than 4 oxygen atoms and no more than 2 hydroxyl groups and no more than 11 carbon atoms, said secondary solvent having an Aniline Point not greater than 130° F.; the precipitation and separation of unreacted polyhydric alcohol from the mother liquor taking place at a temperature between 20 and 140° C. which is sufficiently high to make said primary and said secondary solvents substantially miscible and which is sufficiently high to hold polyhydric alcohol esters in solution but sufficiently low to cause the polyhydric alcohol to precipitate.

2. A process according to claim 1, including the step of neutralizing said alkaline catalyst in the reaction mass subsequent to completion of said transesterification reaction and prior to the completion of the precipitation step to prevent modification of the product after precipitation of unreacted polyhydric alcohol from the reaction mass has begun.

3. A process according to claim 1, wherein the secondary solvent consists essentially of a hydrocarbon having a boiling range which falls below 350° C. at atmospheric pressure and 0 to 50% of oxygenated hydrocarbon solvent in which each molecule contains no more than 4 oxygen atoms, no more than 2 hydroxyl groups and no more than 11 carbon atoms.

4. A process according to claim 1, wherein the secondary solvent consists essentially of a hydrocarbon solvent having an Aniline Point no higher than 130° F. and a boiling range which falls below 350° C.

5. A process according to claim 4, wherein said hydrocarbon is an aromatic compound.

6. A process according to claim 1, wherein the amount of secondary solvent added is from about 0.8 to 4.0 times the weight of primary solvent retained in the reaction mass.

7. A process according to claim 1, wherein the solid polyhydric alcohol is sucrose.

8. A process according to claim 1, wherein the solid polyhydric alcohol is sorbitol.

9. A process according to claim 1, wherein the solid polyhydric alcohol is mannitol.

10. A process according to claim 1, wherein the solid polyhydric alcohol is methyl-D-glucoside.

11. A process according to claim 1, wherein the solid polyhydric alcohol is ethyl-D-glucoside.

12. A process according to claim 1, wherein the solid polyhydric alcohol is raffinose.

13. A process according to claim 1, wherein the carboxy acid is a fatty acid.

14. A process according to claim 1, wherein the primary solvent is dimethyl formamide.

15. A process according to claim 14, wherein the solid polyhydric alcohol is sucrose and the secondary solvent consists essentially of aromatic hydrocarbon having a boiling range below 350° C.

16. A process according to claim 1, wherein the primary solvent is pyrrolidone.

17. A process according to claim 1, wherein the primary solvent is dimethyl acetamide.

18. A process according to claim 1, wherein the primary solvent is N-methyl pyrrolidone.

19. A process according to claim 1, wherein after transesterification, the reaction mass contains from 30–80% by weight of primary solvent.

References Cited in the file of this patent
UNITED STATES PATENTS
2,893,990     Hass _____ July 7, 1959

UNITED STATES PATENT OFFICE
CERTIFICATE OF CORRECTION

Patent No. 3,141,012                                  July 14, 1964

Charles J. O'Boyle

It is hereby certified that error appears in the above numbered patent requiring correction and that the said Letters Patent should read as corrected below.

Column 4, line 61, for "n-methyl" read -- N-methyl --; column 5, line 9, for "carauba" read -- carnauba --; column 8, line 33, strike out "fitting anchor-shaped stainless steel agitator, a thermo-"; columns 11 and 12, Table 3, under the heading "Unreacted Sugar In Product, Solids, Sol .1", line 3 thereof, for "34.8" read -- 43.8 --; column 11, line 71, for "hydrogen" read -- hydrocarbon --; column 12, line 44, for "Analine" read -- Aniline --; column 13, line 45, for "ananlyzed" read -- analyzed --; column 14, line 12, for "then" read -- the --.

Signed and sealed this 17th day of November 1964.

(SEAL)
Attest:

ERNEST W. SWIDER                                     EDWARD J. BRENNER
Attesting Officer                                          Commissioner of Patents